(12) United States Patent
Takabatake

(10) Patent No.: US 8,970,886 B2
(45) Date of Patent: Mar. 3, 2015

(54) METHOD AND APPARATUS FOR SUPPORTING USER'S OPERATION OF IMAGE READING APPARATUS

(71) Applicant: PFU Limited, Kahoku-shi, Ishikawa (JP)

(72) Inventor: Masanari Takabatake, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/830,036

(22) Filed: Mar. 14, 2013

(65) Prior Publication Data

US 2013/0329247 A1 Dec. 12, 2013

(30) Foreign Application Priority Data

Jun. 8, 2012 (JP) .................................. 2012-130967

(51) Int. Cl.
*G06F 3/12* (2006.01)
*H04N 1/00* (2006.01)
*G06F 3/042* (2006.01)
*H04N 1/195* (2006.01)

(52) U.S. Cl.
CPC ....... *H04N 1/00408* (2013.01); *H04N 1/00241* (2013.01); *G06F 3/0426* (2013.01); *H04N 1/19594* (2013.01); *H04N 2201/0436* (2013.01)
USPC .......... 358/1.15; 345/156; 345/175; 348/143; 358/474; 358/537; 715/201

(58) Field of Classification Search
None
See application file for complete search history.

(56) References Cited

U.S. PATENT DOCUMENTS

| 5,511,148 A | 4/1996 | Wellner |
| 6,067,112 A * | 5/2000 | Wellner et al. ............. 348/211.4 |
| 6,493,469 B1 * | 12/2002 | Taylor et al. ................... 382/284 |
| 6,516,151 B2 | 2/2003 | Pilu |
| 6,820,237 B1 * | 11/2004 | Abu-Hakima et al. ........ 715/210 |
| 6,904,392 B1 * | 6/2005 | Marty et al. ...................... 703/1 |
| 8,418,048 B2 * | 4/2013 | Shi et al. ......................... 715/201 |
| 8,422,106 B2 * | 4/2013 | Yanagawa ..................... 358/537 |
| 8,488,213 B2 * | 7/2013 | Campbell et al. ............. 358/474 |
| 8,577,146 B2 * | 11/2013 | Thorn et al. ................... 382/181 |
| 2003/0165276 A1 * | 9/2003 | Seeger et al. ................. 382/278 |
| 2005/0091577 A1 * | 4/2005 | Torres et al. .................. 715/507 |
| 2008/0215976 A1 * | 9/2008 | Bierner et al. ................ 715/708 |
| 2009/0002344 A1 | 1/2009 | Wilson et al. |
| 2009/0013044 A1 * | 1/2009 | Stull ............................. 709/205 |
| 2009/0229819 A1 * | 9/2009 | Repin et al. .............. 166/250.01 |
| 2011/0169776 A1 | 7/2011 | Ouchi |
| 2012/0288172 A1 * | 11/2012 | Perrey et al. .................. 382/131 |

FOREIGN PATENT DOCUMENTS

| JP | 5-150364 A | 6/1993 |
| JP | 8-204914 A | 8/1996 |
| JP | 10-327312 A | 12/1998 |

(Continued)

*Primary Examiner* — David S Cammack
(74) *Attorney, Agent, or Firm* — McDermott Will & Emery LLP

(57) ABSTRACT

A write operation supporting apparatus 1 includes a camera 3 that images a placed document 10 as a reading target within an imaging area 6 and a projector 4 that displays information toward the imaging area 6. A control device 5 of the write operation supporting apparatus 1 displays, by the projector 4, operation supporting information for supporting an information writing operation using the document 10 toward the imaging area 6, based on positional information of the document 10 on the imaging area 6 acquired by the camera 3, with relative position relation with the medium 10 on the imaging area 6 maintained.

9 Claims, 8 Drawing Sheets

(56) References Cited

FOREIGN PATENT DOCUMENTS

| | | |
|---|---|---|
| JP | 2005-184361 A | 7/2005 |
| JP | 2006-304127 A | 11/2006 |
| JP | 2007-013425 A | 1/2007 |
| WO | WO-2011/152166 A1 | 12/2011 |

* cited by examiner

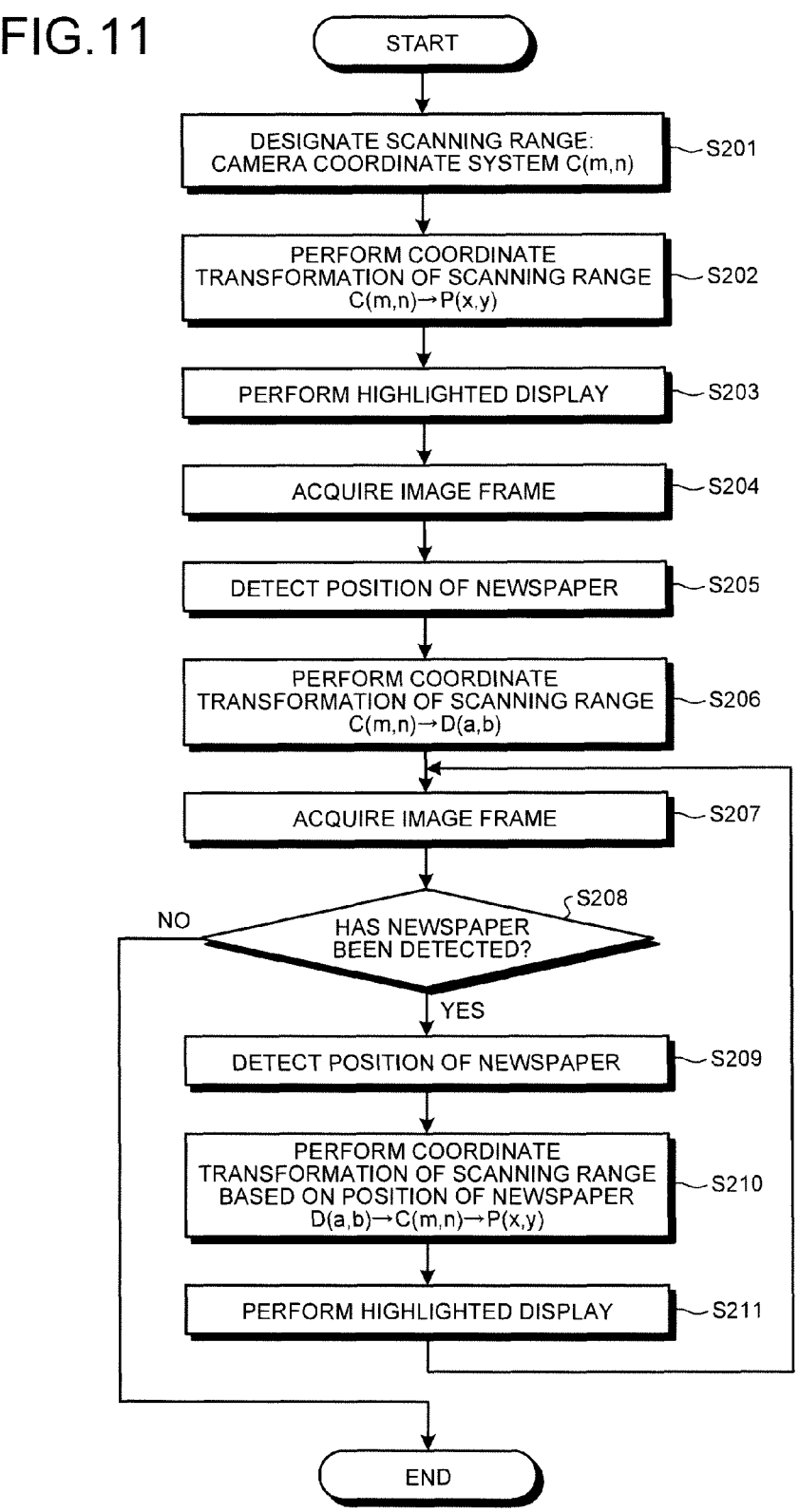

METHOD AND APPARATUS FOR SUPPORTING USER'S OPERATION OF IMAGE READING APPARATUS

CROSS-REFERENCE TO RELATED APPLICATION(S)

This application is based on and claims the benefit of priority from Japanese Patent Application No. 2012-130967, filed on Jun. 8, 2012, the entire contents of which are incorporated herein by reference.

BACKGROUND OF THE INVENTION

1. Field of the Invention

The present invention relates to an image processing apparatus and an image processing method.

2. Description of the Related Art

Conventionally, an image processing apparatus such as a scanner apparatus is controlled by a personal computer (PC) or the like connected thereto, and, generally, a main operation is performed on the PC side. Accordingly, a medium as a reading target is placed inside the apparatus, while an image of the medium is displayed on a separate display device, on which the operation is performed (for example, Japanese Patent Application Laid-open No. 8-204914).

However, in a conventional type of image processing apparatus in which a read image is displayed on a separate display device, when an operation or a setting is performed for the image processing apparatus, an operator needs to handle both the image processing apparatus and the display device. Since this produces a lot of unnecessary motions of the eyes and body of the operator, there is a possibility that work or operation by using the image processing apparatus may be ineffective.

SUMMARY OF THE INVENTION

The present invention is directed to an image processing apparatus that eliminates the possibility.

One aspect of the present invention relates to an image processing apparatus. The image processing apparatus includes an imaging unit that images a placed medium as a reading target within an imaging area, and a display unit that displays information toward the imaging area. Operation supporting information for supporting an operation using the medium is displayed toward the imaging area by the display unit, based on positional information of the medium on the imaging area acquired by the imaging unit, with relative position relation with the medium on the imaging area maintained.

BRIEF DESCRIPTION OF THE DRAWINGS

FIG. 11 is a flowchart that illustrates the process of a highlighted display performed by the scanner apparatus according to the second embodiment of the present invention.

DETAILED DESCRIPTION OF THE INVENTION

Figure 1:
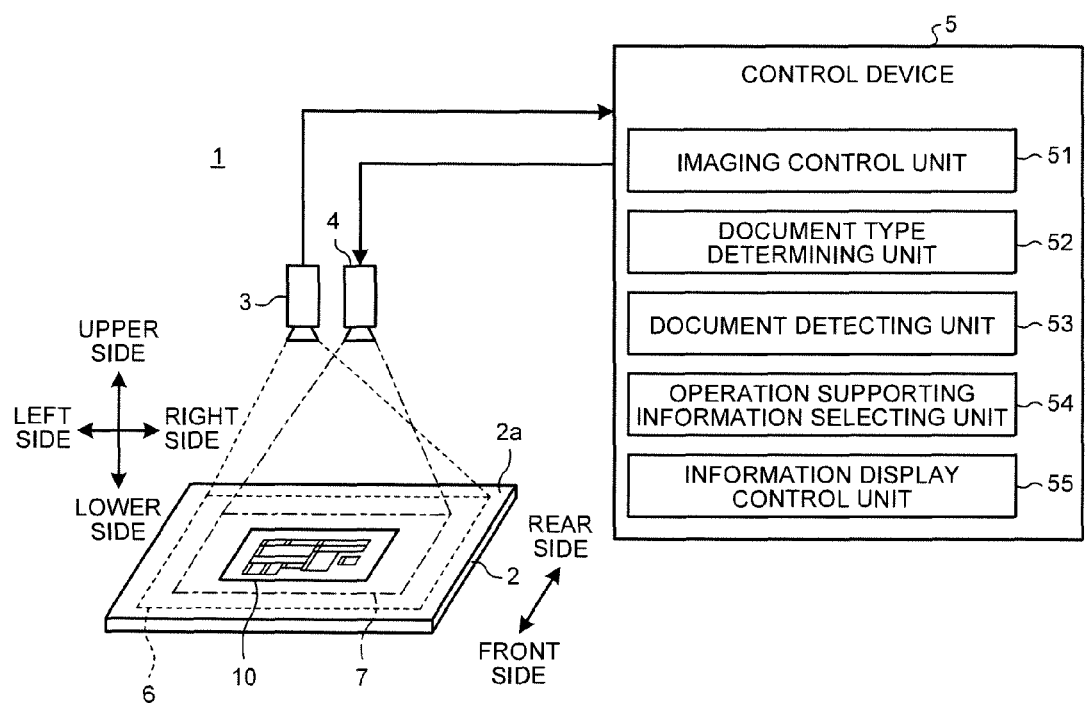
FIG. 1 is a schematic diagram that illustrates the configuration of a write operation supporting apparatus as an example of an image processing apparatus according to a first embodiment of the present invention.

Hereinafter, an image processing apparatus, an image reading apparatus, an image processing method, and a computer-readable storage medium that stores therein an image processing program according to embodiments of the present invention will be described with reference to the drawings. In the following drawings, the same reference numeral is assigned to the same parts or parts corresponding to each other, and the description thereof will not be repeated.

First Embodiment

A first embodiment of the present invention will be described with reference to FIGS. 1 to 6. In this embodiment, a write operation supporting apparatus used for supporting an operation of writing a document such as an application form will be described as an example of an image processing apparatus. First, the configuration of the write operation supporting apparatus according to this embodiment will be described with reference to FIG. 1. FIG. 1 is a schematic diagram that illustrates the configuration of the write operation supporting apparatus as an example of an image processing apparatus according to a first embodiment of the present invention.

As illustrated in FIG. 1, a write operation supporting apparatus 1 may display "operation supporting information" used for supporting an operator of this apparatus 1 to perform an operation using a document 10 (medium), on the document 10 (medium) placed on a placing face 2a arranged on the top face of a plate-shaped placing stand 2 or on the periphery thereof. Here, the "operation supporting information" according to this embodiment is information used for supporting an operator's write operation for writing information into various items of the document 10, and, for example, may include a highlighted display of a write position (selected area) according to the type of the document 10, a text or a mark urging an operator to write information into the write position, a switch image, that is, an image having a function of a switch to instruct performing various operation relating to the write operation, and the like.

In addition, the write operation supporting apparatus 1 may display the operation supporting information toward a relative position with the document 10. A situation may be considered, in which the position of the document 10 on the placing face 2a changes, such as a situation in which an operator moves the document to an easily-writable position at the time of writing information into the document 10 or a situation in which the document moves in accordance with an operator's write operation in the middle of the write operaapparatus 1 is configured to allow the display position of the operation supporting information to follow the movement of the document 10, with the relative positional relation with the document 10 maintained.

The write operation supporting apparatus 1 includes a placing stand 2, a camera 3 (imaging unit), a projector 4 (display unit), and a control device 5.

The placing stand 2 is a plate-shaped member and has a placing face 2a for placing a document 10 such as an application form, which is a target of the write operation, on the upper face thereof. Alternatively, the write operation supporting apparatus 1 may employ a configuration in which the placing stand 2 is not included, and a flat face such as the upper face of a stand to which the write operation supporting apparatus 1 is installed is used as the placing face 2a.

The camera 3 images a document 10 placed on the placing face 2a within a predetermined imaging area 6 arranged on the placing face 2a. The camera 3 is installed on the upper side of the placing face 2a so as to enable imaging the imaging area 6 arranged on the placing face 2a. The camera 3 operates under the control of the control device 5 and, in a case where the document 10 is placed on the placing face 2a, may image the document 10 disposed within the imaging area 6, and transmits the captured image to the control device 5. The camera 3 may image only the document 10 in a case where the document 10 has a size covering the entire area of the imaging area 6, and may image the document 10 and the imaging area 6 covering the periphery thereof in a case where the document 10 has a size smaller than the imaging area 6. In addition, in a case where the document 10 is larger than the imaging area 6, or a part of the document 10 protrudes from the imaging area 6, the camera 3 may image a part of the document 10 disposed within the imaging area 6 and the imaging area 6 in a case where the imaging area 6 remains on the periphery thereof.

A projector 4 displays information toward the imaging area 6 of the camera 3 in an overlapping manner. The projector 4 displays operation supporting information generated by the control device 5, which will be described later, toward a projection area 7 arranged on the placing face 2a. The projector 4 is arranged over the upper side of the placing face 2a such that at least a part of the projection area 7 overlaps the imaging area 6 of the camera 3. The area of the projection area 7 of the projector 4 may be smaller than that of the imaging area 6 of the camera 3, as illustrated in FIG. 1, or contrary to the example illustrated in FIG. 1, may be larger than that of the imaging area 6 of the camera 3. The shape of the projection area 7 of the projector 4 may be the same as or different from that of the imaging area 6. In a case where a document 10 or an operator's finger is present in the imaging area 6, the projector 4 may display the operation supporting information on the document 10 or the finger in an overlapping manner or display the operation supporting information on the periphery thereof.

The control device 5 controls the operations of the camera 3 and the projector 4. In this embodiment, the control device 5, based on the information relating to the state of the device itself or the information acquired by the camera 3, is configured to select operation supporting information for supporting an operation using the document 10 and display the selected operation supporting information toward the imaging area 6 of the placing face 2a by using the projector 4. In more detail, the control device 5 can perform a highlighted display of a write area 11 (see FIG. 2) on the document 10 by using the projector 4, based on positional information of the document 10 acquired by the camera 3. In addition, when the document 10 moves on the imaging area 6, the control device 5 can allow the position of the highlighted display to follow the movement of the document 10 while maintaining the relative position with respect to the document 10 on the imaging area 6.

More specifically, the control device 5, as illustrated in FIG. 1, is configured to realize the functions of an imaging control unit 51 (imaging function), a document type determining unit 52, a document detecting unit 53, an operation supporting information selecting unit 54, and an information display control unit 55 (display function) to be described below.

The imaging control unit 51 performs an imaging operation by controlling the operation of the camera 3, thereby acquiring a captured image of the document 10 placed in the imaging area 6 of the camera 3.

The document type determining unit 52 determines a type of the document 10 placed on the placing face 2a. The document type determining unit 52 extracts a feature point (for example, a barcode) on the document 10, by analyzing the captured image of the document 10 acquired by the imaging control unit 51, and determines the type of the document 10 based on the feature point. The document type determining unit 52 can determine the type of the document 10 by referring to a database that associates the feature point with the type of the document 10, based on the feature quantity of the document 10 that is extracted from the captured image. For example, the database that associates the feature quantity of the document 10 with the type is contained in a storage unit (not illustrated in the figure) inside the control device 5.

The document detecting unit 53 detects positional information of the document 10 within the imaging area 6, based on the captured image of the document 10 that has been acquired by the imaging control unit 51. Here, the positional information of the document 10 can include position coordinates, which are based on a camera coordinate system C in which the m axis and the n axis are arranged on the placing face 2a, and an inclination angle θ of the document 10 with respect to the camera coordinate system C (see FIG. 5).

The operation supporting information selecting unit 54 selects operation supporting information that can be displayed on the placing face 2a, based on the type of the document 10 identified by the document type determining unit 52 and the positional information of the document 10 detected by the document detecting unit 53. In more detail, the operation supporting information selecting unit 54 can select the write area 11 that is set in advance for each type of the document 10 as the operation supporting information, and can perform a highlighted display of the write area 11 (see FIG. 2). The operation supporting information selecting unit 54 can select the write area 11 of the document 10 by referring to a database associating the type of the document 10 with the write area 11, based on the type of the document 10 identified by the document type determining unit 52. For example, the database associating the type of the document 10 with the write area 11 is contained in a storage unit (not illustrated in the figure) inside the control device 5.

The operation supporting information selecting unit 54 sets a display position of the write area 11 on the placing face 2a, which has been selected in accordance with the type of the document 10 as above, based on the positional information of the document 10 detected by the document detecting unit 53. The write area 11 is set as position coordinates that are based on a document coordinate system D in which the a axis and the b axis are arranged on the document 10 (see FIG. 5). The operation supporting information selecting unit 54 transforms the position coordinates of the write area 11 set in this document coordinate system D into positional information of the camera coordinate system C, based on the positional information of the current document 10.

Moreover, the operation supporting information selecting unit 54 can include a message 12 (see FIG. 2) urging a write operation, as the operation supporting information displayed on the placing face 2a, in addition to the highlighted display of the write area 11.

The information display control unit 55 displays the operation supporting information selected by the operation supporting information selecting unit 54, and more particularly, the highlighted display of the write area 11 of the document 10 on the placing face 2a, by controlling the operation of the projector 4.

In addition, in a case where there is a difference in the position, the area, the resolution, or the like between the imaging area 6 of the camera 3 and the projection area 7 of the projector 4, the information display control unit 55 can perform transformation of both the coordinates. As calibration for the coordinate transformation, for example, a technique may be used in which a transformation table created on the coordinate relation of four designated points is used. When the camera coordinates of the four points are denoted by $Ci(m, n)$, and the projector coordinates thereof are denoted by $Pi(x,y)$ (i=1 to 4), the following equation is obtained:

$$Pi(x,y)=T*Ci(m,n)(i=1 \text{ to } 4),$$

where T represents a transformation matrix. The transformation matrix T can be used as a transformation table.

The control device 5 is a computer that includes a central processing unit (CPU), a random access memory (RAM), a read only memory (ROM), and the like, in a physical sense. All or some of the above-described functions of the control device 5 are realized by loading an application program contained in the ROM into the RAM and executing the application program through the CPU, or by reading and writing data from and into the RAM or the ROM.

In addition, the above-described application program may be stored on a computer-readable recording medium or may be configured as a program product. Here, this "recording medium" includes an arbitrary "portable physical medium" such as a memory card, a USB memory, an SD card, a flexible disk, a magneto-optical disk, a ROM, an EPROM, an EEPROM, a CD-ROM, an MO, a DVD, or a Blu-ray Disc. Furthermore, the application program may be stored in an application program server that is connected to the control device 5 through an arbitrary network, and all or a part of the application program may be downloaded if need arises.

In addition, the control device 5 may be configured to be installed inside of the write operation supporting apparatus 1 or can be configured to be connected as an external device of the write operation supporting apparatus 1.

Figure 2:
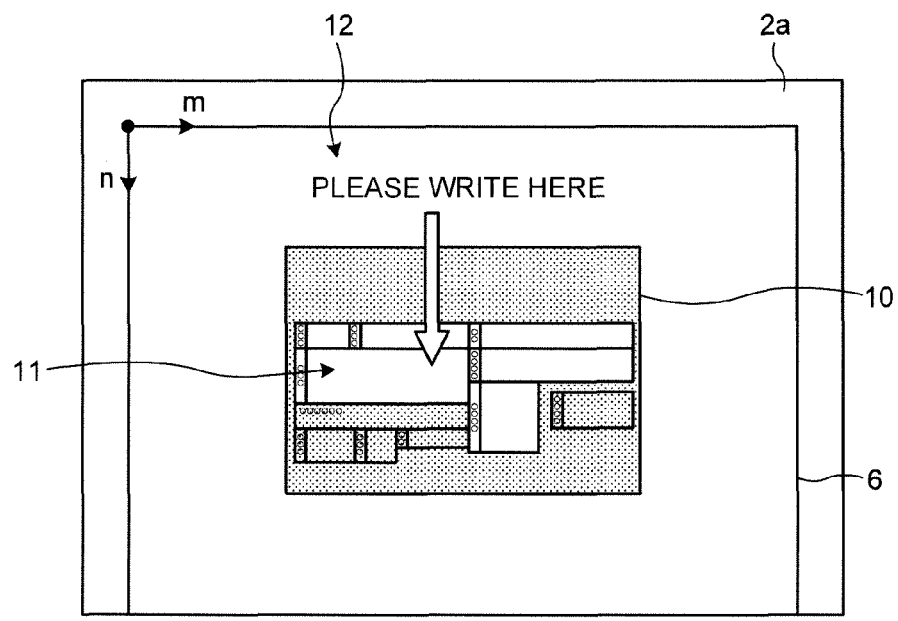
FIG. 2 is a schematic diagram that illustrates a highlighted display of a document.
Figure 3:
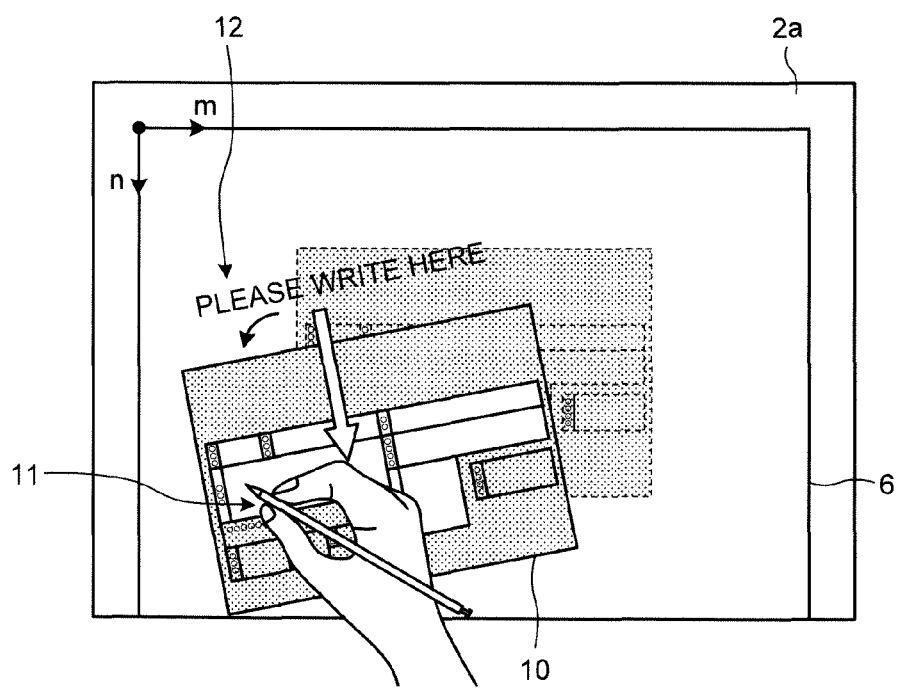
FIG. 3 is a schematic diagram that illustrates a following operation of the highlighted display.
Figure 4:
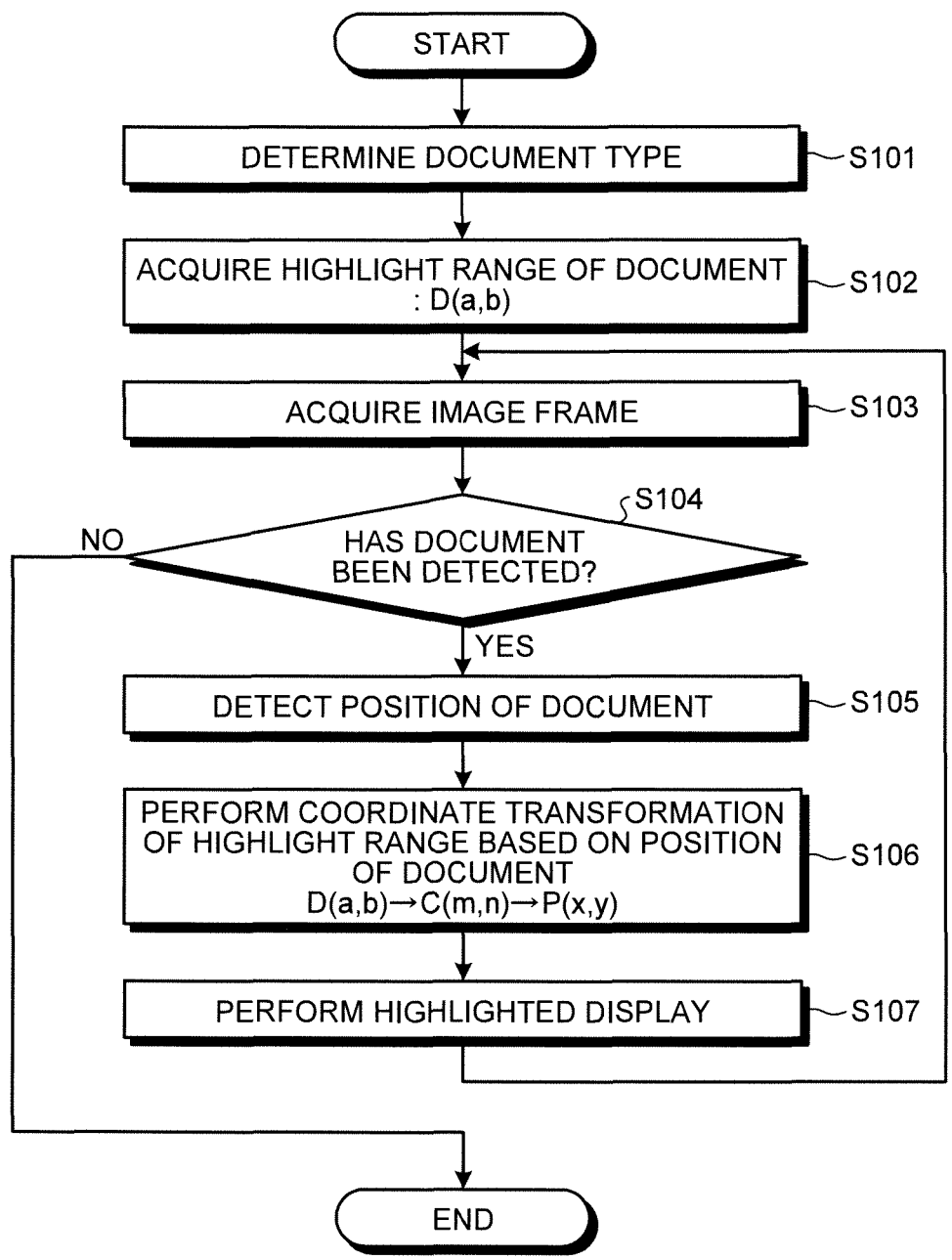
FIG. 4 is a flowchart that illustrates a highlight display process performed by the write operation supporting apparatus according to the first embodiment of the present invention.
Figure 5:
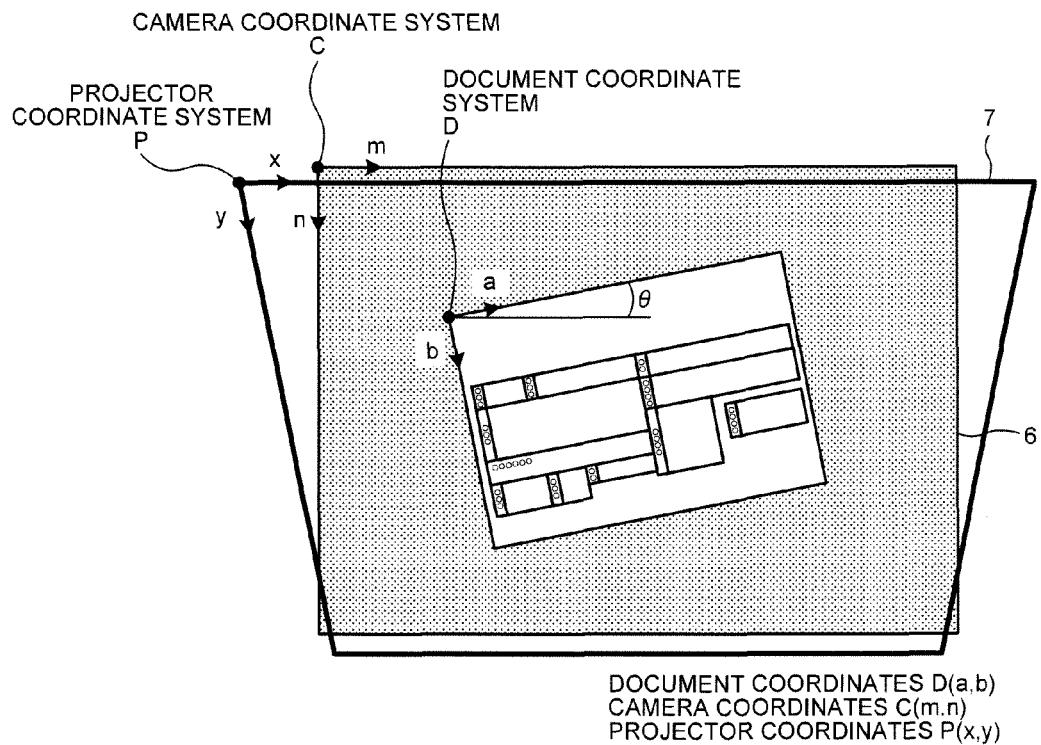
FIG. 5 is a diagram that illustrates a coordinate system used in the highlight display process in FIG. 4.
Figure 6:
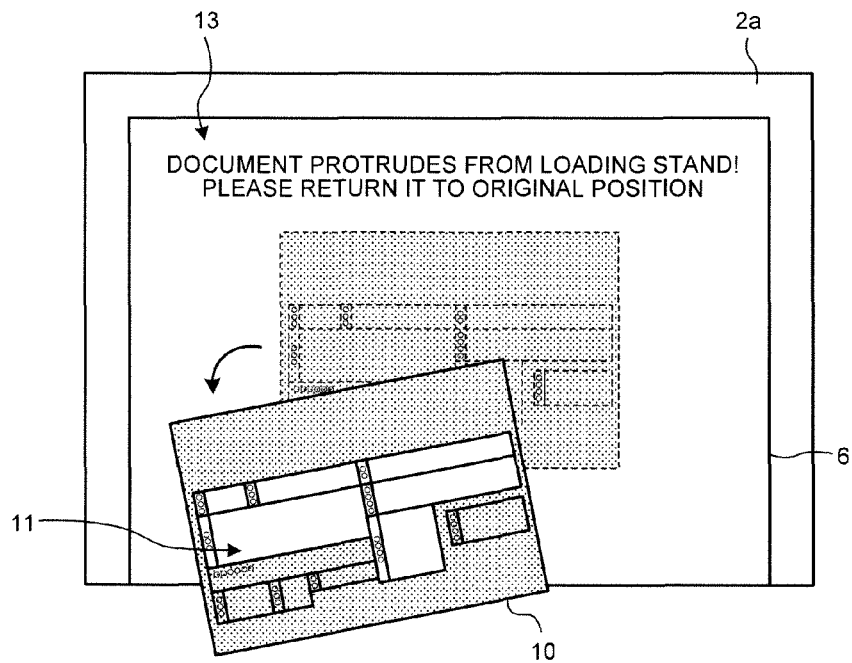
FIG. 6 is a schematic diagram that illustrates a warning operation when a document protrudes from a placing face.

Next, the operation of the write operation supporting apparatus 1 according to this embodiment will be described with reference to FIGS. 2 to 6. FIG. 2 is a schematic diagram that illustrates a highlighted display of a document. FIG. 3 is a schematic diagram that illustrates a following operation of the highlighted display. FIG. 4 is a flowchart that illustrates a highlighted display process performed by the write operation supporting apparatus according to the first embodiment of the present invention. FIG. 5 is a diagram that illustrates a coordinate system used in the highlighted display process illustrated in FIG. 4. FIG. 6 is a schematic diagram that illustrates a warning operation when a document departs from a placing face.

As illustrated in FIG. 2, when a document 10 is placed on the placing face 2a, the write operation supporting apparatus 1 selects a write area 11 that is set in advance in correspondence with the type of the document 10 and can perform a highlighted display of the selected write area 11. By brightening only the selected write area 11 and darkening the other area, a highlighted display is performed in which the selected write area 11 (selected area) is highlighted. In addition, the write operation supporting apparatus 1 can display a message 12 urging an operator to perform a write operation for the write area 11 such as "Please write here", near the highlighted write area 11 (hereinafter, also referred to as a "highlight range 11").

As illustrated in FIG. 3, in a case where the document 10 in which the write area 11 is displayed as being highlighted moves on the placing face 2a, the write operation supporting apparatus 1 can allow the display position of the highlighted display to follow the movement of the document 10. In other words, the display position of the highlighted display of the write area 11 on the document 10 is displayed with the relative position maintained with respect to the document 10.

Here, the highlighted display is an example of an emphasized display in which the selected write area 11 is emphasized for the operator. Instead of this, any emphasizing display technique other than the highlighted display such as drawing a frame along the contour of the write area 11 or changing a background color of the write area 11 can be applied.

The operation of the highlighted display process performed by the write operation supporting apparatus 1 will be described with reference to a flowchart illustrated in FIG. 4. The process illustrated in the flowchart of FIG. 4 is performed, for example, when the placing of a document 10 on the placing stand 2 is detected.

First, the type of the document 10 placed on the placing face 2a is determined by the document type determining unit 52 (Step S101). The document type determining unit 52 analyzes an image frame of the captured image of the placing face 2a acquired by the imaging control unit 51, and extracts a feature point (for example, a barcode) on the document 10. The type of the document 10 can be determined by referring to a database that associates this feature point with the type.

Next, a highlight range 11 of the document 10 is acquired based on the type of the document 10 determined in Step S101, by the operation supporting information selecting unit 54 (Step S102). The highlight range 11 represents positional information of the write area 11 that is subject to the highlighted display, and is set in advance for each type of the document 10. The operation supporting information selecting unit 54 can acquire the highlight range 11 of the document 10, by referring to a database that associates the type of the document 10 and the write area 11 (highlight range 11) that is subject to the highlighted display. The highlight range 11 acquired here, as illustrated in FIG. 5, is set as document coordinates D (a, b) that are position coordinates using as a reference a document coordinate system D that designates the upper left side of the document 10 as an origin, the horizontal direction as an a axis, and the vertical direction as a b axis.

Next, an image frame of the captured image of the placing face 2a is acquired by controlling the camera 3 through the imaging control unit 51 (Step S103: imaging step), the image frame is analyzed by the document detecting unit 53, and it is determined whether or not the placing of the document 10 has been detected on the placing face 2a (Step S104). In a case where the document 10 has been detected on the placing face 2a (Yes in Step S104), the process proceeds to Step S105. On the other hand, in a case where the document 10 has not been detected on the placing face 2a (No in Step S104), the process ends.

In a case where the document 10 has been detected on the placing face 2a in Step S104 (Yes in Step S104), positional information of the document 10 placed on the placing face 2a is continuously detected by the document detecting unit 53 (Step S105). The positional information of the document 10, as illustrated in FIG. 5, can include position coordinates using based on the camera coordinate system C that designates the upper left side of the imaging area 6 of the camera 3 as an origin, the horizontal direction as an m axis, and the vertical direction as an n axis, and an inclination angle θ with respect to the m axis of the camera coordinate system C.

Next, by the operation supporting information selecting unit 54 and the information display control unit 55, based on the positional information of the document 10 detected in Step S105, the document coordinates D(a, b) of the highlight range 11 of the document 10 acquired in Step S102 are transformed into camera coordinates C(m, n) that are position coordinates of the camera coordinate system C, and are further transformed into projector coordinates P(x, y) that are position coordinates of the projector coordinate system P (Step S106). The operation supporting information selecting unit 54 transforms the position coordinates of the highlight range 11 of the document 10 from the document coordinates D(a, b) to the camera coordinates C(m, n), by using the positional information (the position coordinates and the inclination θ of the camera coordinate system C) of the document 10 detected in Step S105. In addition, the information display control unit 55 transforms the position coordinates of the highlight range 11 of the document 10 from the camera coordinate system C(m, n) to the projector coordinates P(x, y), for example, by using the above-described transformation table T.

Then, by using the position coordinates P(x, y) of the projector coordinate system P for the document 10 acquired in Step S106, the write area 11 is subject to the highlighted display toward the document 10 on the placing face 2a (Step S107: display step), and the process is returned to Step S103. The process steps from Step S103 to Step S107 are repeated until the document 10 on the placing face 2a runs out as in a case where the document 10 is removed from the placing face 2a or the like. In other words, since the placing positions of the document 10 are sequentially detected in Step S105, the position of the highlighted display of the write area 11 moves so as to follow the document 10 in accordance with the movement of the document 10 on the placing face 2a, with the relative position with respect to the document 10 maintained.

Here, in a case where the document 10 protrudes from the placing face 2a, for example, as when an operator moves the document 10 on the placing face 2a more than is necessary so as to place the document 10 at a position at which characters can be easily written, it may be considered that the write area 11 for the highlighted display deviates from the projection area 7 of the projector 4. In such a case, there is a possibility that only a part of the write area 11 is highlighted, and the support of the write operation is not sufficiently performed. Thus, when it is detected by the document detecting unit 53 that at least a part of the document 10 protrudes from the imaging area 6 or the placing face 2a, for example, as illustrated in FIG. 6, it may be configured to urge the operator to be warned by displaying a warning message 13 (warning information), such as "Document protrudes from placing stand! Please return it to the original position" on the placing face 2a through the projector 4.

Next, advantages of the write operation supporting apparatus 1 according to this embodiment will be described.

The write operation supporting apparatus 1 according to this embodiment includes the camera 3 that images the document 10 as a placed reading target within the imaging area 6, and the projector 4 that displays information toward the imaging area 6. The control device 5 of the write operation supporting apparatus 1 displays the operation supporting information, which supports an information writing operation using the document 10, toward the imaging area 6 through the projector 4, based on the positional information of the document 10 on the imaging area 6 acquired by the camera 3, while maintaining the relative positional relation with the document 10 disposed on the imaging area 6.

By employing such a configuration, the operation supporting information (a highlighted display of the write area 11 on the document 10 or the message 12 urging an operator to write information), which supports the information writing operation for the document 10, is displayed through the projector 4, with the relative positional relation with the document 10 on the imaging area 6 maintained. Accordingly, the operator of the write operation supporting apparatus 1 can perform the information writing operation by using only an area of the document 10 within the imaging area 6 on the placing face 2a or the periphery thereof. This does not produce unnecessary motions of the eyes and body of the operator, whereby an effective operation can be performed. In addition, since the operator can perform the write operation while referring to the operation supporting information displayed at a relative position from the document 10, information that is necessary during the operation can be instantly checked at that place, whereby an effective operation can be performed.

At the time of actually writing information into the document 10 on the placing stand 2, there are cases where placing the document 10 obliquely provides easier writing, or the document 10 moves in the middle of the write operation. Accordingly, there is a possibility that a highlighted display is deviated from the actual write area. In the write operation supporting apparatus 1 according to this embodiment, when the document 10 moves on the imaging area 6, the display position of the operation supporting information on the imaging area 6 is allowed to follow the movement of the document 10.

By employing such a configuration, even in a case where the position of the document 10, which is subject to the highlighted display, deviates, the highlighted display of the write area 11 can be allowed to follow the movement of the document, whereby the highlighted display can be matched with the actual write area 11 on the document 10. Accordingly, even in a case where the document 10 moves after the write area 11 is highlighted, the operator can continue to perform the write operation with the write area 11 highlighted, whereby a practical and effective operation can be performed.

In addition, in the write operation supporting apparatus 1 of this embodiment, the write operation supporting information is a highlighted display of the write area 11 (selected area) on the document 10 that is set in accordance with the type of the document 10. From this, by only placing the document 10 on the placing face 2a, the write area 11 is automatically selected and shown with the highlighted display. Accordingly, the operator can easily determine a write position, whereby an effective write operation can be performed.

Furthermore, in the write operation supporting apparatus 1 of this embodiment, when at least a part of the document 10 deviates from the imaging area 6, a warning message 13 (warning information) is displayed on the imaging area 6 by the projector 4. By employing such a configuration, the operator can be warned so as to place the document 10 within the imaging area 6, and the document 10 can be suppressed from deviating from the imaging area 6, whereby the highlighted display of the write area 11 can be stably performed, and the write operation can be appropriately supported.

In addition, in the first embodiment, although the document type determining unit 52 of the control device 5 is configured to analyze the captured image of the document 10 acquired by the imaging control unit 51 and automatically determine the type of the document 10, instead of this, the type of the document 10 may be configured to be manually determined based on a selection instruction supplied from the operator. For example, by displaying selection buttons corresponding to the types of the document 10 on the placing face 2a and detecting a selection button pressed by the operator, the type of the document 10 may be determined.

Furthermore, in the above-described first embodiment, while the write operation supporting apparatus 1 has been described as an example of the image processing apparatus, the present invention can be applied to another type of image processing apparatus as long as the operation supporting information is displayed on the document 10 placed on the placing face 2a or the periphery thereof, and the operation supporting information can follow the movement of the document 10.

In addition to the above-described configuration, it may be configured such that the highlighted display is sequentially turned off starting from an area for which writing has been completed, out of the highlighted write areas 11, and a completion message is displayed when all the writing is completed. Here, the completion of the writing may be determined by using a technique for determining whether or not a certain character is written at a specific position, a technique for determining whether or not a valid content is written using OCR together, or the like.

Second Embodiment

Figure 7:
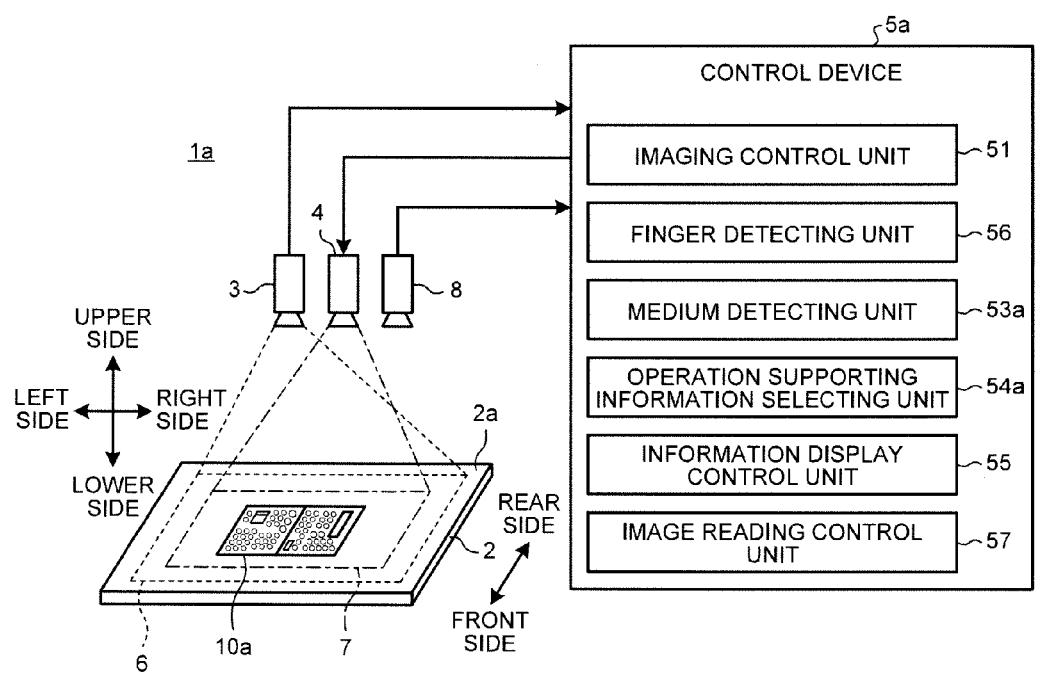
FIG. 7 is a schematic diagram that illustrates the configuration of a scanner apparatus as an example of an image reading apparatus according to a second embodiment of the present invention.

A second embodiment of the present invention will be described with reference to FIGS. 7 to 11. In this embodiment, a scanner apparatus will be described as an example of an image reading apparatus. First, the configuration of the scanner apparatus according to the embodiment will be described with reference to FIG. 7. FIG. 7 is a schematic diagram that illustrates the configuration of the scanner apparatus as the example of the image reading apparatus according to the second embodiment of the present invention.

As illustrated in FIG. 7, a scanner apparatus 1a is an overhead-type scanner apparatus that can read a medium 10a as a reading target placed on a placing face 2a on the upper face of a plate-shaped placing stand 2, by using an optical unit 8 (image reading unit) arranged on the upper side.

The optical unit 8 can apply an existing image reading mechanism that can generate a read image of a medium 10a, by imaging the medium 10a placed on the placing face 2a on the lower side. As an example thereof, regarding as a reading target line an arbitrary position in the front and rear directions on the placing face 2a, the optical unit 8 includes a line sensor that can read an image of the line. The optical unit 8 can generate a read image of the whole medium 10a, by moving the position of the reading target line for the line sensor along the front and rear directions of the placing face 2a. The optical unit 8 operates under the control of a control device 5a to be described later and generates a read image of the medium 10a.

In addition, the scanner apparatus 1a can receive input information supplied from an operator in accordance with the position, the shape, and the movement of operator's fingers on the placing face 2a detected from a captured image acquired by a camera 3 under the control of the control device 5a. Moreover, the scanner apparatus 1a is configured to support a scanning operation, while taking two-way interaction with the operator, for example, by performing the operation of the scanner apparatus 1a, updating the operation supporting information displayed on the placing face 2a through a projector 4, or the like, in accordance with the input information of an operator. In more detail, the scanner apparatus 1a can, by the movement of operator's fingers on the placing face 2a, perform range designation of a partial area (hereinafter, referred to as a "scanning range 14") of an article or a section the operator desires to scan, out of the medium 10a such as a newspaper or a book placed on the placing face 2a, and can generate a read image of the designated scanning range 14.

The control device 5a controls the operations of the camera 3, the projector 4, and the optical unit 8. More specifically, the control device 5a, as illustrated in FIG. 7, is configured to realize the functions of an imaging control unit 51 (imaging function), a finger detecting unit 56, a medium detecting unit 53a, an operation supporting information selecting unit 54a, an information display control unit 55 (display function), and an image reading control unit 57 to be described below.

The finger detecting unit 56 detects operator's fingers disposed within the imaging area 6, by analyzing the captured image of the imaging area 6 acquired by the imaging control unit 51. For the recognition of operator's fingers, a known technology in which fingertips are detected by extracting the contour of a hand from a skin-color component of the captured image, and the like can be used. The finger detecting unit 56 calculates positional information of fingers when the fingers are detected within the imaging area 6. The positional information of fingers includes the coordinates of the center of the hand and at least a portion of the coordinates of the fingertips of five fingers. In addition, in a case where there are two hands of the operator within the imaging area 6, the positional information of the fingers of both hands is calculated.

In addition, the finger detecting unit 56 can detect a tap operation using an operator's finger on the placing face 2a, and a switch pressing operation using an operator's finger when switches representing various operation instructions are displayed on the placing face 2a by the projector 4 to be described later. For the detection of the tap operation or the switch pressing operation in the finger detecting unit 56, for example, the following techniques can be used.

(1) When the position of a fingertip stops for a predetermined time, it is assumed that a tap operation or a switch pressing operation is performed at the position of the coordinates of the fingertip at that time.

(2) When a distance sensor detects that the position of a fingertip in the vertical direction has changed more than a predetermined value, it is assumed that a tap operation or a switch pressing operation is performed at the position of the coordinates of the fingertip at that time.

(3) When a proximity sensor (including infrared ray light and an infrared camera) disposed on the placing face 2a detects that a fingertip has touched the placing face 2a or the fingertip has approached the placing face 2a, it is assumed that a tap operation or a switch pressing operation is performed at the position of the coordinates of the fingertip at that time.

The medium detecting unit 53a detects positional information of the medium 10a within the imaging area 6, based on the captured image of the imaging area 6 acquired by the imaging control unit 51. The positional information of the medium 10a, as described in the first embodiment with reference to FIG. 5, can include position coordinates that are based on the camera coordinate system C having the m axis and the n axis arranged on the placing face 2a, and an inclination angle θ of the medium 10a with respect to the camera coordinate system C.

The operation supporting information selecting unit 54a selects operation supporting information that can be displayed on the placing face 2a, based on the information of the positions or the movement of operator's fingers detected by the finger detecting unit 56 or the positional information of the medium 10a detected by the medium detecting unit 53a. Described in more detail, the operation supporting information selecting unit 54a can select information supporting an operation of designating a specific article or only a part of the medium 10a such as a newspaper or an operation of scanning a designated range part. More specifically, the operation supporting information of this embodiment represents a drawing of the designated range of the scanning range 14 according to an operator's tap operation on the placing face 2a, a highlighted display (emphasized display) of the designated scanning range 14, or a drawing of the switches relating to a scanning operation.

The operation supporting information selecting unit 54a sets the display position of the selected operation supporting information on the placing face 2a based on the positional information of the medium 10a detected by the medium detecting unit 53a or the positional information of operator's fingers detected by the finger detecting unit 56.

The image reading control unit 57 performs a reading operation of the medium 10a by controlling the operation of the optical unit 8, thereby generating a read image of the medium 10a. For example, in a case where only a part of the medium 10a is selected as the scanning range 14 as described above, the image reading control unit 57 can generate a read image for the selected part only.

In addition, since the imaging control unit 51 and the information display control unit 55 have the same functions as those of the first embodiment, the description thereof will not be presented.

Figure 8:
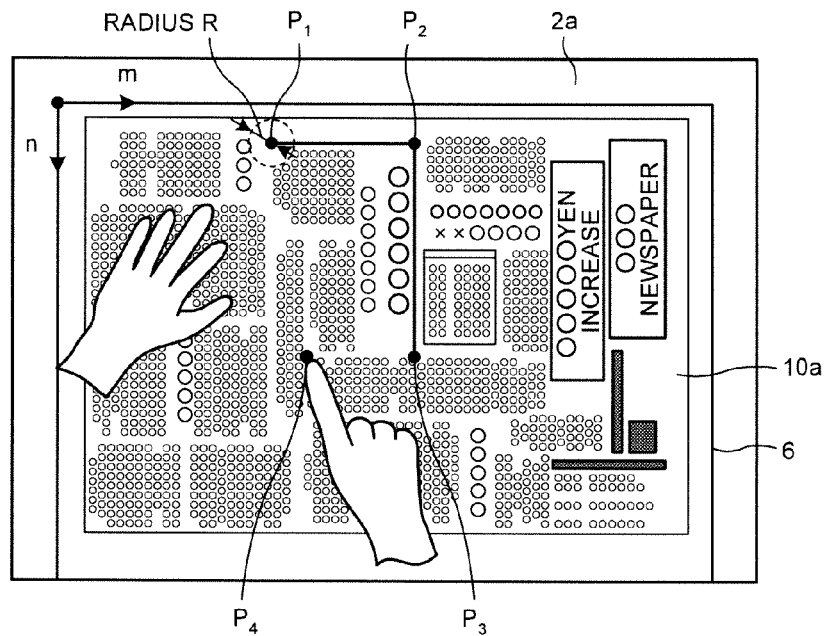
FIG. 8 is a schematic diagram that illustrates an operation of designating a scanning range of a medium.
Figure 9:
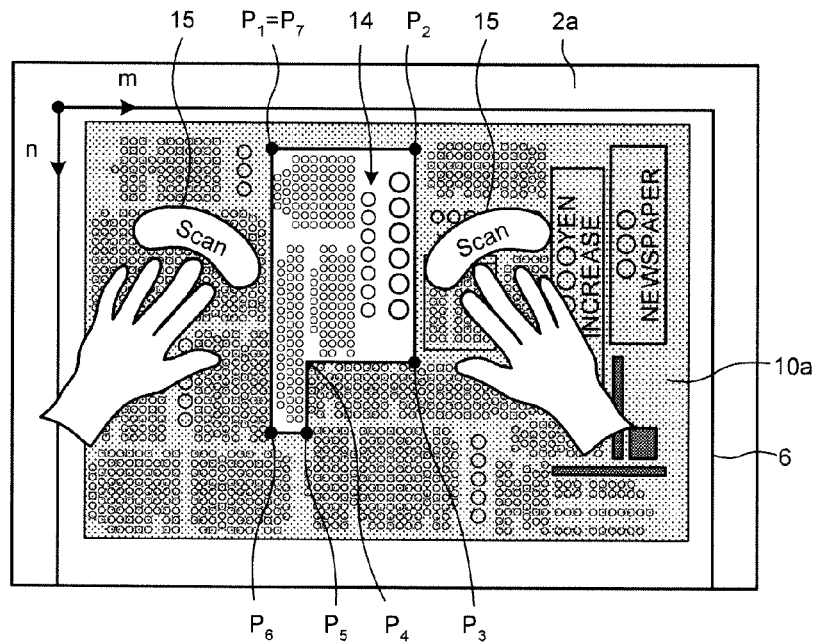
FIG. 9 is a schematic diagram that illustrates a highlighted display of the scanning range.
Figure 10:
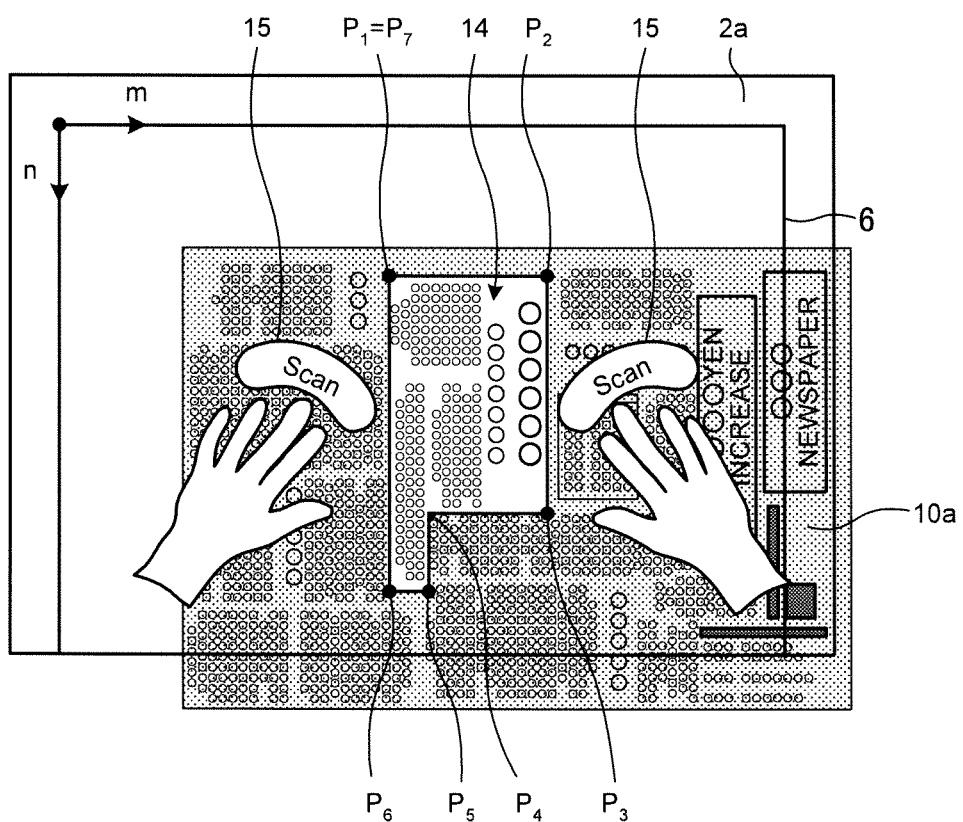
FIG. 10 is a schematic diagram that illustrates a following operation of the highlighted display.

Next, the operation of the scanner apparatus according to this embodiment will be described with reference to FIGS. 8 to 11. FIG. 8 is a schematic diagram that illustrates an operation of designating a scanning range of a medium. FIG. 9 is a schematic diagram that illustrates a highlighted display of the scanning range. FIG. 10 is a schematic diagram that illustrates a following operation of the highlighted display. FIG. 11 is a flowchart that illustrates the process of a highlighted display performed by the scanner apparatus according to the second embodiment of the present invention. In an explanation presented below, a newspaper will be taken up as an example of the medium 10a, and an operation of selecting and scanning an article included in the newspaper 10a will be described.

As illustrated in FIG. 8, when an operator taps on a corner of an article he desires to read within the area of the newspaper 10a placed on the placing face 2a, the scanner apparatus 1a draws and displays a maker representing a corner point toward the tap position. In other words, the position on the newspaper 10a is designated by a tap operation through an operator's fingertip. When a new marker is displayed, the scanner apparatus 1a draws a boundary line between the new marker and an old marker for which the operator has previously tapped. In the example illustrated in FIG. 8, tap operations are detected in order of $P_1 \rightarrow P_2 \rightarrow P_3 \rightarrow P_4$ at the positions thereof, markers are displayed, and boundary lines are drawn between markers $P_1$ and $P_2$ and markers $P_2$ and $P_3$.

When a tap operation is detected near the marker $P_1$ drawn at the first tap operation (for example, within a radius of R as illustrated in FIG. 8), the scanner apparatus 1a assumes that all the boundary lines between markers are connected and completes the designation operation of the scanning range 14. In the example illustrated in FIG. 9, since the seventh marker $P_7$ is displayed near the marker $P_1$, the marker $P_7$ is displayed at the position of the marker $P_1$ in an overlapping manner, and, as a result, a scanning range 14 is demarcated by the markers $P_1$ to $P_7$. Thereafter, as illustrated in FIG. 9, only the designated scanning range 14 is brightened, and the other area is darkened, whereby a highlighted display in which the designated scanning range 14 (selected area) is emphasized is performed.

In addition, as illustrated in FIG. 9, in a state in which the operator presses the newspaper 10a using both hands, and both the hands are restrained, the scanner apparatus 1a draws scanning switches 15 toward the inside of peripheral areas (on the fingers or on the periphery thereof) of the fingers. Then, in a case where an operation of pressing the scanning switch 15 using an operator's finger is detected, a scanning operation is performed. In addition, although not illustrated in FIG. 9, for example, a switch used for an instruction for performing an operation other than a scanning operation, such as a "contour modifying" operation in which the scanning range 14 of the newspaper 10a is modified, may be displayed together.

Similarly to the first embodiment, the highlighted display is described as an example of an emphasized display in which the designated scanning range 14 is emphasized for the operator. Instead of this, any emphasizing display technique other than the highlighted display, such as drawing a frame along the contour of the scanning range 14 or changing a background color of the scanning range 14, can be applied.

In addition, as illustrated in FIG. 10, in a case where the newspaper 10a, whose scanning range 14 is shown with the highlighted display, moves on the placing face 2a, the scanner apparatus 1a can allow the display position of the highlighted display to follow the movement of the newspaper 10a. In other words, the scanning range 14 on the newspaper 10a and the display position of the highlighted display are displayed, with the relative position maintained with respect to the newspaper 10a.

The operation of the process of the highlighted display by the scanner apparatus 1a will be described with reference to a flowchart illustrated in FIG. 11. The process illustrated in the flowchart of FIG. 11 is performed, for example, when the placing of the newspaper 10a on the placing stand 2 is detected.

First, an operation of designating the scanning range 14 is detected by the operation supporting information selecting unit 54a (Step S201). The operation supporting information selecting unit 54a demarcates the scanning range 14, based on the position coordinates of a tap operation through an operator's fingertip detected by the finger detecting unit 56. At this time, the positional information of the scanning range 14 is acquired as camera coordinates C(m, n).

The positional information of the scanning range 14 acquired in Step S201 is transformed from the camera coordinates C(m, n) to the projector coordinates P(x, y) by the information display control unit 55 (Step S202). The scanning range 14 is shown with the highlighted display toward the newspaper 10a on the placing face 2a, through the projector coordinates P(x, y) (Step S203).

Next, an image frame of the captured image of the placing face 2a is acquired by controlling the camera 3 through the imaging control unit 51 (Step S204). The image frame is analyzed by the medium detecting unit 53a, whereby the positional information of the newspaper 10a placed on the placing face 2a is detected (Step S205). The positional information of the newspaper 10a, as described in the first embodiment with reference to FIG. 5, can include position coordinates based on the camera coordinate system C that designates the upper left side of the imaging area 6 of the camera 3 as the origin, the horizontal direction as the m axis, and the vertical direction as the n axis, and an inclination angle θ with respect to the m axis of the camera coordinate system C.

Then, based on the position coordinates of the camera coordinate system C of the newspaper 10a detected in Step S205, the camera coordinates C(m, n) of the scanning range 14 acquired in Step S201 are transformed into the document coordinates D(a, b) (Step S206). The document coordinates D(a, b) of the scanning range 14 acquired as above are relative position coordinates of the scanning range 14 designated in Step S201 with respect to the newspaper 10a, and are constant regardless of a change in the placing position of the newspaper 10a while the designation of the scanning range 14 is maintained. Based on the document coordinates D(a, b) of the scanning range 14 and the position coordinates of the camera coordinate system C of the newspaper 10a, the highlighted position of the scanning range 14 can be allowed to follow the movement of the newspaper 10a.

Next, an image frame is acquired again by the imaging control unit 51 (Step S207: imaging step). The image frame is analyzed by the medium detecting unit 53a to confirm whether or not the placing of the newspaper 10a on the placing face 2a is detected (Step S208). In a case where the newspaper 10a is detected on the placing face 2a (Yes in Step S208), the process proceeds to Step S209. On the other hand, in a case where the newspaper 10a is not detected on the placing face 2a (No in Step S208), the process ends.

In a case where the newspaper 10a is detected on the placing face 2a in Step S208, the positional information of the newspaper 10a placed on the placing face 2a is detected by the medium detecting unit 53a (Step S209). The positional information of the newspaper 10a, similarly to Step S205, includes position coordinates based on the camera coordinate system C and an inclination angle θ with respect to the m axis of the camera coordinate system C.

Next, based on the positional information of the newspaper 10a detected in Step S209, the document coordinates D(a, b) of the scanning range 14 of the newspaper 10a acquired in Step S206 are transformed into camera coordinates C(m, n) and are further transformed into projector coordinates P(x, y), by the operation supporting information selecting unit 54a and the information display control unit 55 (Step S210). The operation supporting information selecting unit 54a transforms the position coordinates of the scanning range 14 of the newspaper 10a from the document coordinates D(a, b) to the camera coordinates C(m, n), by using the positional information (the position coordinates and the inclination B of the camera coordinate system C) of the newspaper 10a detected in Step S209. In addition, the information display control unit 55 transforms the position coordinates of the scanning range 14 of the newspaper 10a from the camera coordinate system C(m, n) to the projector coordinates P(x, y), for example, by using the above-described transformation table T.

Then, by using the position coordinates P(x, y) of the projector coordinate system P of the newspaper 10a acquired in Step S210, the scanning range 14 is shown with the highlighted display toward the newspaper 10a on the placing face 2a (Step S211: display step). The process then returns to Step S207. The process steps from Step S207 to Step S211 are repeated until newspaper 10a on the placing face 2a runs out as in a case where the newspaper 10a is removed from the placing face 2a or the like. In other words, since the placing positions of the newspaper 10a are sequentially detected in Step S209, the position of the highlighted display of the scanning range 14 moves so as to follow the newspaper 10a in accordance with the movement of the newspaper 10a on the placing face 2a, with the relative position with respect to the newspaper 10a maintained.

Next, advantages of the scanner apparatus according to this embodiment will be described.

When a newspaper is to be scanned, there are many cases where data of the whole face of the newspaper is not desired to be acquired, but only information of a specific article in the newspaper is desired to be scanned, for example, for clipping newspaper articles. In a conventional scanner apparatus, it is general that after the whole face of the newspaper is scanned, only a necessary part is cut out and stored using application software. Accordingly, a large amount of data of the whole newspaper needs to be read at once, and, after reading the whole data, an operation of cutting out a necessary portion is performed, which is not desirable in terms of data capacity or operation efficiency. To solve this problem, there is a proposal that only an article designated in advance is cut out and then scanned and stored. However, there is a possibility that when the newspaper moves after the designation of a cut-out range, the designated range shifts, which leads to a situation where a range other than the originally desired range may be stored.

In the scanner apparatus 1a of this embodiment, the optical unit 8 reads at least a part of the newspaper 10a, based on the scanning range 14 on the newspaper 10a that is designated by an operator's fingertip. In other words, in the state in which the scanning range 14 of the newspaper 10a is selected by the operator (in FIGS. 9 and 10 and between Steps S207 to S211 of the flowchart illustrated in FIG. 11), the scanner apparatus 1a can perform image reading after cutting out only the scanning range 14 of the newspaper 10a, by operating the image reading control unit 57 and the optical unit 8, in accordance with an operation input of the scanning switch 15 illustrated in FIGS. 9 and 10.

By employing such a configuration, a read image can be generated by extracting only a necessary article designated by the scanning range 14, whereby the amount of data generated by the scanning operation can be reduced.

In addition, in the scanner apparatus 1a, based on the positional information of the newspaper 10a acquired by the camera 3, a highlighted display of the scanning range 14 is performed by the projector 4, toward the relative position from the newspaper 10a on the imaging area 6. In other words, when the newspaper 10a moves on the imaging area 6, the display position of the highlighted display of the scanning range 14 on the imaging area 6 follows the movement of the newspaper 10a.

According to this configuration, even when the position of the newspaper 10a on the placing face 2a has shifted after the designation of the scanning range 14, the relative position of the scanning range 14 with the newspaper 10a can be maintained, and the position of the highlighted display on the imaging area 6 can be matched with the scanning range 14 that the operator has actually selected. Due to this, even when the newspaper moves after the designation of the cutout range to cause the designation range to shift, the originally necessary range can be stored, whereby an effective scanning operation can be performed, and the convenience of the scanning operation can be improved.

Furthermore, in the scanner apparatus 1a, the optical unit 8 is a unit different from the camera 3 for imaging the medium 10a so as to provide the operation supporting information. Accordingly, even in the middle of the scanning operation performed by the optical unit 8, the movement of the newspaper 10a or the behavior of operator's fingers and the like can be monitored by the camera 3. When the newspaper 10a moves on the imaging area 6 during a reading operation performed by the optical unit 8, information can be displayed by the projector 4 on the placing face 2a if need arises.

By employing such a configuration, even when a sudden change in the state, such as a change in the position of the medium like the newspaper 10a as a reading target, occurs during a scanning operation, the scanning operation can be continued while appropriate information is supplied to the operator. Accordingly, the scanning operation can be smoothly performed, whereby the efficiency of the scanning operation can be further improved. In addition, the information displayed on the placing face 2a at this time, for example, may include a highlighted display of the scanning range 14 that follows the movement of the newspaper 10a, and a message and an alarm sound for warning during the scanning operation that the position of the newspaper 10a has deviated.

In addition, since the scanner apparatus 1a of this embodiment, similarly to the write operation supporting apparatus 1 according to the first embodiment, has a configuration including the camera 3 and the projector 4, the same advantages as those of the first embodiment can be acquired.

In the above-described embodiment, while the scanner apparatus 1a has been described as an example of the image reading apparatus reading the medium 10a, the present invention can also be applied to the other image reading apparatuses such as a copier, a facsimile, and a character recognition apparatus.

In addition, in the above-described embodiment, since the scanner apparatus 1a has been described as an example of the image reading apparatus, information for supporting the scanning operation using the medium 10a has been described as an example of the operation supporting information displayed on the placing face 2a. On the other hand, in a case where the present invention is applied to an image reading apparatus other than the scanner apparatus 1a or an image processing apparatus, information for supporting an operation, which each apparatus treats as a target, can be appropriately set as the content of the operation supporting information.

In the above-described embodiment, although the finger detecting unit 56 of the control device 5a has an exemplary configuration in which the positional information of operator's fingers disposed within the imaging area 6 is calculated based on the captured image, the finger detecting unit 56 may have a configuration in which information other than the positional information such as the shape or the movement of a hand or finger or a gesture is detected.

In the above-described embodiment, although the configuration has been described as an example in which the camera 3 for acquiring an image for supporting the operation and the optical unit 8 for reading an image are included as separate units, a single imaging device that can realize the functions of both the camera 3 and the optical unit 8 may be used instead of them.

With regard to an image processing apparatus, an image reading apparatus, an image processing method, and a computer-readable storage medium that stores therein an image processing program according to the embodiments of the present invention, since operation supporting information is displayed at a relative position from a medium disposed within an imaging area through a display unit, an operator can perform an operation only on the medium or in a peripheral area thereof. This generates the advantage that unnecessary motions of the eyes and body of the operator are not produced, whereby an effective operation can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an imaging unit that images a placed medium as a reading target within an imaging area;
a display unit that displays information toward the imaging area;
a memory storing computer executable instructions; and
a central processing unit configured to execute the instructions to perform following steps;
detecting positional information of the medium on the imaging area based on an image from the imaging unit;
identifying a type of the placed medium by analyzing the image;
selecting operation supporting information based on the identified type of the medium;
generating the operation supporting information for supporting an operation using the medium; and
controlling the display unit to display the operation supporting information toward the imaging area with relative position relation with the medium on the imaging area maintained.

2. The image processing apparatus according to claim 1, wherein, when the medium moves on the imaging area, a display position of the operation supporting information on the imaging area follows the movement of the medium.

3. The image processing apparatus according to claim 1, wherein the operation supporting information is an emphasized display of a selected area on the medium that is set corresponding to a type of the medium.

4. The image processing apparatus according to claim 1, wherein the operation supporting information is an emphasized display of a selected area on the medium that is designated by an operator's fingertips.

5. The image processing apparatus according to claim 1, wherein, when at least a part of the medium protrudes from the imaging area, the display unit displays warning information on the imaging area.

6. An image reading apparatus comprising:
an image reading unit that reads at least a part of a medium based on operation supporting information; and
the image processing apparatus according to claim 1.

7. The image reading apparatus according to claim 6, wherein, when the medium moves on the imaging area during a reading operation performed by the image reading unit, the display unit displays information if need arises.

8. An image processing method for an image processing apparatus, wherein the image processing apparatus includes an imaging unit that images a placed medium as a reading target within an imaging area, a display unit that displays information toward the imaging area, a memory storing computer executable instructions and a central processing unit configured to execute the instructions stored in the memory, the image processing method comprising:
imaging a placed medium as a reading target within the imaging area, through the imaging unit;
detecting positional information of the medium on the imaging area based on an image from the imaging:
identifying a type of the placed medium by analyzing the image;

selecting operation supporting information based on the identified type of the medium:

generating the operation supporting information for supporting an operation using the medium based on the positional information; and displaying operation supporting information for supporting an operation using the medium toward the imaging area by the display unit, with relative position relation with the medium on the imaging area maintained.

9. A non-transitory computer-readable storage medium that stores therein an image processing program for an image processing apparatus, wherein the image processing apparatus includes an imaging unit that images a placed medium as a reading target within an imaging area and a display unit that displays information toward the imaging area, a memory storing computer executable instructions and a central processing unit configured to execute the instructions stored in the memory, the image processing program causing the image processing apparatus to execute:

imaging a placed medium as a reading target within the imaging area through the imaging unit;

detecting positional information of the medium on the imaging area based on an image from the imaging:

identifying a type of the placed medium by analyzing the image;

selecting operation supporting information based on the identified type of the medium;

generating the operation supporting information for supporting an operation using the medium based on the positional information; and displaying operation supporting information for supporting an operation using the medium toward the imaging area by the display unit, with relative position relation with the medium on the imaging area maintained.

* * * * *